United States Patent
Lazaridis et al.

(10) Patent No.: US 7,233,310 B2
(45) Date of Patent: Jun. 19, 2007

(54) MONOCHROMATIC FIELD SEQUENTIAL LIQUID CRYSTAL DISPLAY

(75) Inventors: Mihal Lazaridis, Waterloo (CA);
Robert J. Lowles, Waterloo (CA);
Jason T. Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 553 days.

(21) Appl. No.: 10/785,638

(22) Filed: Feb. 24, 2004

(65) Prior Publication Data

US 2005/0035940 A1    Feb. 17, 2005

Related U.S. Application Data

(60) Provisional application No. 60/494,398, filed on Aug. 12, 2003.

(51) Int. Cl.
*G09G 3/36* (2006.01)

(52) U.S. Cl. .................................................. 345/102

(58) Field of Classification Search ............... 345/102; 349/30, 65; 362/561, 559, 600
See application file for complete search history.

(56) References Cited

U.S. PATENT DOCUMENTS

| | | | |
|---|---|---|---|
| 6,496,236 B1 * | 12/2002 | Cole et al. .................. | 349/61 |
| 6,577,361 B1 * | 6/2003 | Sekiguchi et al. ........... | 349/96 |
| 6,608,614 B1 * | 8/2003 | Johnson ...................... | 345/102 |
| 6,744,416 B2 * | 6/2004 | Mizutani et al. ............. | 345/88 |
| 2001/0043177 A1 | 11/2001 | Huston et al. | |

FOREIGN PATENT DOCUMENTS

| | | |
|---|---|---|
| EP | 1 361 563 A | 11/2003 |
| JP | 11 064820 | 3/1999 |
| JP | 2003 060944 | 2/2000 |
| JP | 2003 084715 | 3/2003 |
| WO | WO 00/79328 A | 12/2000 |

* cited by examiner

*Primary Examiner*—Kevin M. Nguyen
(74) *Attorney, Agent, or Firm*—Jones Day; Krishna K. Pathiyal; Robert C. Liang

(57) ABSTRACT

A device and a method are provided for establishing a monochromatic background light source in an electronic device with a field sequential liquid crystal display. The device and method provide for the continuous illumination of one or more of a plurality of color backlights of a field sequential liquid crystal display to provide a monochromatic source of light behind the liquid crystal layer of the display. The intensities of the one or more of the plurality of color backlights may be selected to achieve a user selected color, or the intensities may be chosen to reduce power consumption. The monochromatic mode may be selected while in another mode of operation.

21 Claims, 5 Drawing Sheets

MONOCHROMATIC FIELD SEQUENTIAL LIQUID CRYSTAL DISPLAY

This application claims the benefit of U.S. Ser. No. 60/494,398 filed Aug. 12, 2003, which disclosure is incorporated herein by reference.

BACKGROUND

Several types of color displays are known for use in mobile devices. These known devices have limitations however, including high power consumption requirements and limited color saturation capabilities. Limited color saturation refers to situations in which the display cannot distinctly display subtle color changes. An example of such a known display is an Organic Light-Emitting Diode (OLED) display. A single pixel 10 of an OLED is shown in FIG. 1. Each pixel of an OLED has a set of three color emitters 12: red 12a, green 12b, and blue 12c. Colors other than red, blue and green are generated by illuminating more than one emitter at different intensities. OLED is an emissive display technology, so no backlight is required, but when the OLED is turned off the display is no longer readable. OLED displays generally demonstrate good color saturation, but they consume significant power.

Another type of known color display is a field sequential liquid crystal display (FS LCD). An illustration of an FS LCD 20 is shown in FIG. 2. FS LCD technology does not utilize OLED type color emitters or other known types of filters. An FS LCD panel utilizes a tri-color backlight 22, typically with red 24, green 26, and blue 28 colors and a light guide 30. Behind the light guide 30 is a reflector 32 and in front of the light guide 30 is a liquid crystal layer 34 between top 36 and rear 38 pieces of glass. Liquid crystal layer 34 can be, for example, a monochrome thin film transistor (TFT) display. As illustrated in FIG. 3, in an FS LCD, the tri-color backlight 22 turns on and off individual colors one by one at a rate higher than the human eye can differentiate so that the viewer perceives a composite color made of the individual colors lit during a cycle. As shown in FIG. 3, different fields of the liquid crystal layer 34 can be set to pass light as the individual backlights are illuminated. FIG. 3 shows red 40, blue 42, and green 44 fields being sequentially formed as the respective backlight is illuminated to form a composite image 46. A wide array of colors can be created with this technique.

The rate of the sequence and the time that each backlight is illuminated is a function of, and limited by, the response time of the liquid crystal layer 34. A sixty (60) Hertz frame rate is achieved in the example shown in FIG. 3 by tripling the frame rate of the liquid crystal to 180 Hertz and displaying each color for one-third of the time or 60 or 180 cycles in a second. By this method the human eye perceives a composite image 46 as shown in the center of FIG. 3. If the response time of a liquid crystal is slowed, then eventually the user will be able to see the sequence of the backlight colors. When the rate is slow enough for the user to perceive the sequence of backlights, the user will have difficulty perceiving composite colors and will most likely see fragments of color. Color fragmentation also occurs or becomes more severe when the user either moves with respect to the display or experiences certain vibrations, such as on a bumpy car or train ride. Any degree of color fragmentation makes it difficult for the user to perceive the data being displayed, as individual images or characters may appear blurred. An ideal liquid crystal layer 34 for an FS LCD 100 would have a response time fast enough that users would not see the individual sequencing of the primary colors.

When color fragmentation becomes a problem for the user, one solution is to turn off the multi-color backlight 22, and use the FS LCD 20 as a black on "white" display. The "white" background in this mode is created by ambient light being reflected off the reflector 32 located at the back of the display. In this mode of operation, however, the black characters created by the liquid crystal have shadows caused by reflections of the characters off the reflector 32. Due to shadows and the passive nature of reflected ambient light this mode also has a low contrast ratio.

SUMMARY

A device and a method for establishing a monochromatic background light source in an electronic device with a field sequential liquid crystal display are provided. The device comprises a field sequential liquid crystal display with a liquid crystal layer and a plurality of color backlights, and a control module. To achieve a monochromatic background light source behind the liquid crystal display, the control module controls the continuous illumination of one or more of the plurality of color backlights. The method comprises continuously illuminating one or more of the plurality of color backlights to provide a monochromatic background light behind the liquid crystal display. The intensities of the one or more of the plurality of color backlights may be selected to achieve a user selected color, or the intensities may be chosen to reduce power consumption. The monochromatic mode may be selected while in another mode of operation.

DETAILED DESCRIPTION

Figure 1:
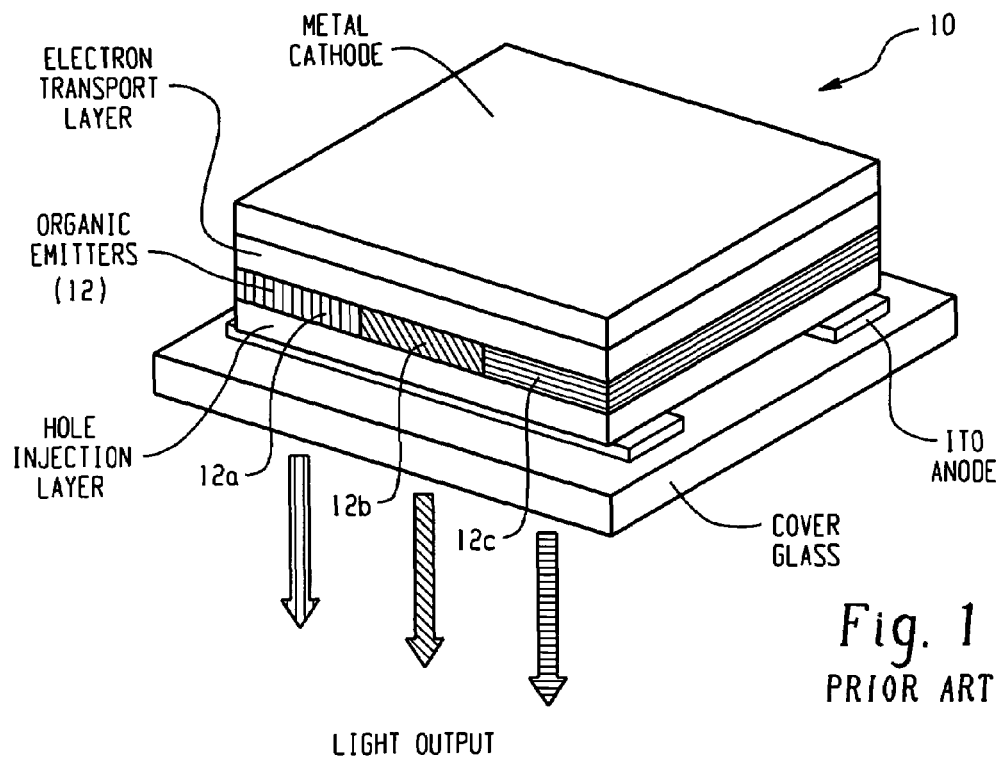
FIG. 1 is a diagram illustrating an organic light emitting diode (OLED).
Figure 2:
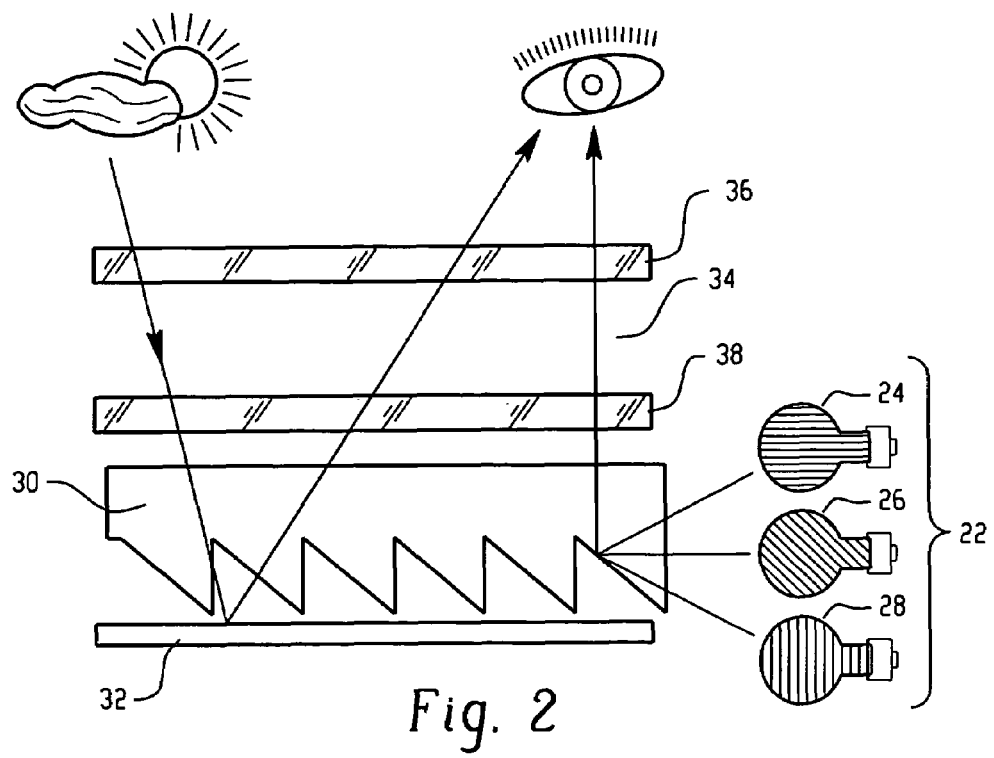
FIG. 2 is a diagram showing a field sequential liquid crystal display (FS LCD).
Figure 3:
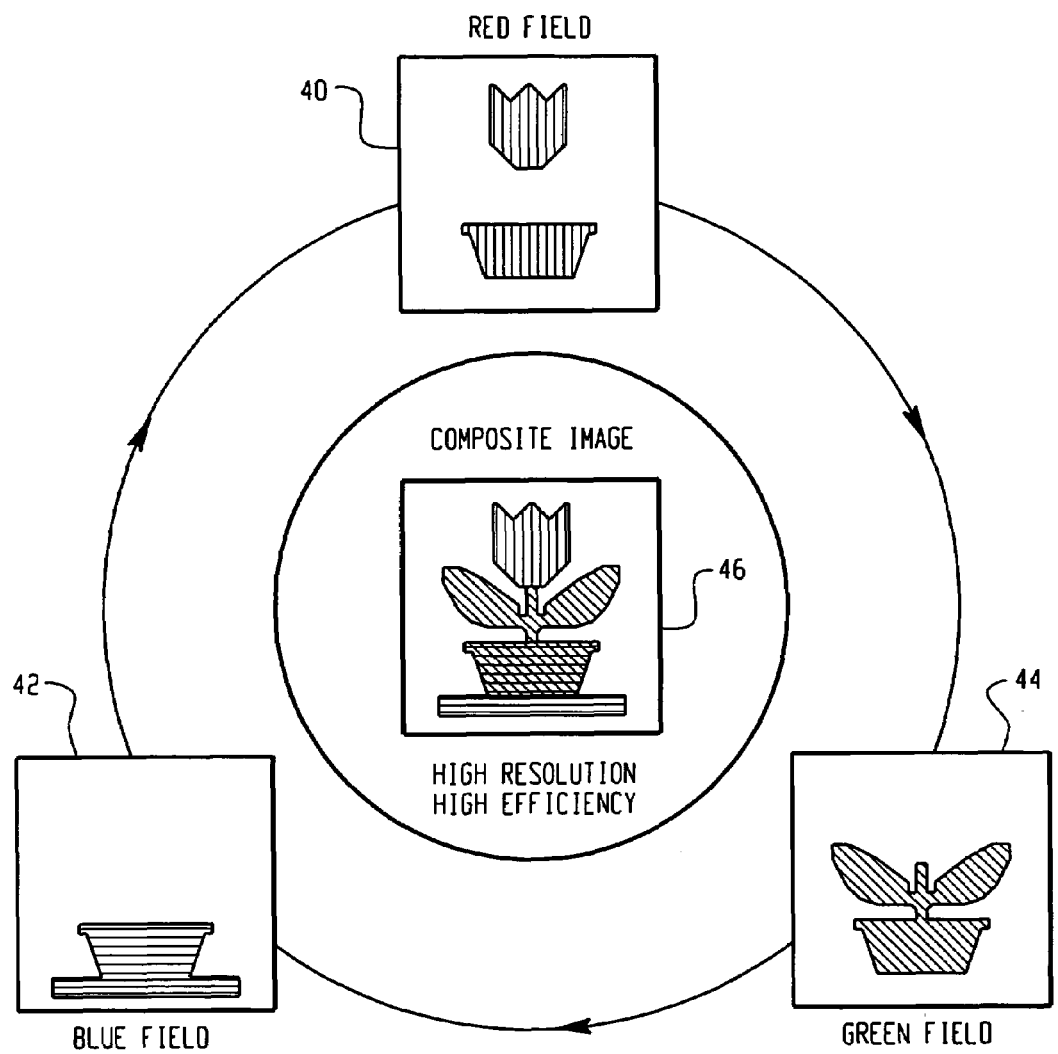
FIG. 3 is a diagram showing a FS LCD scanning sequence.
Figure 4:
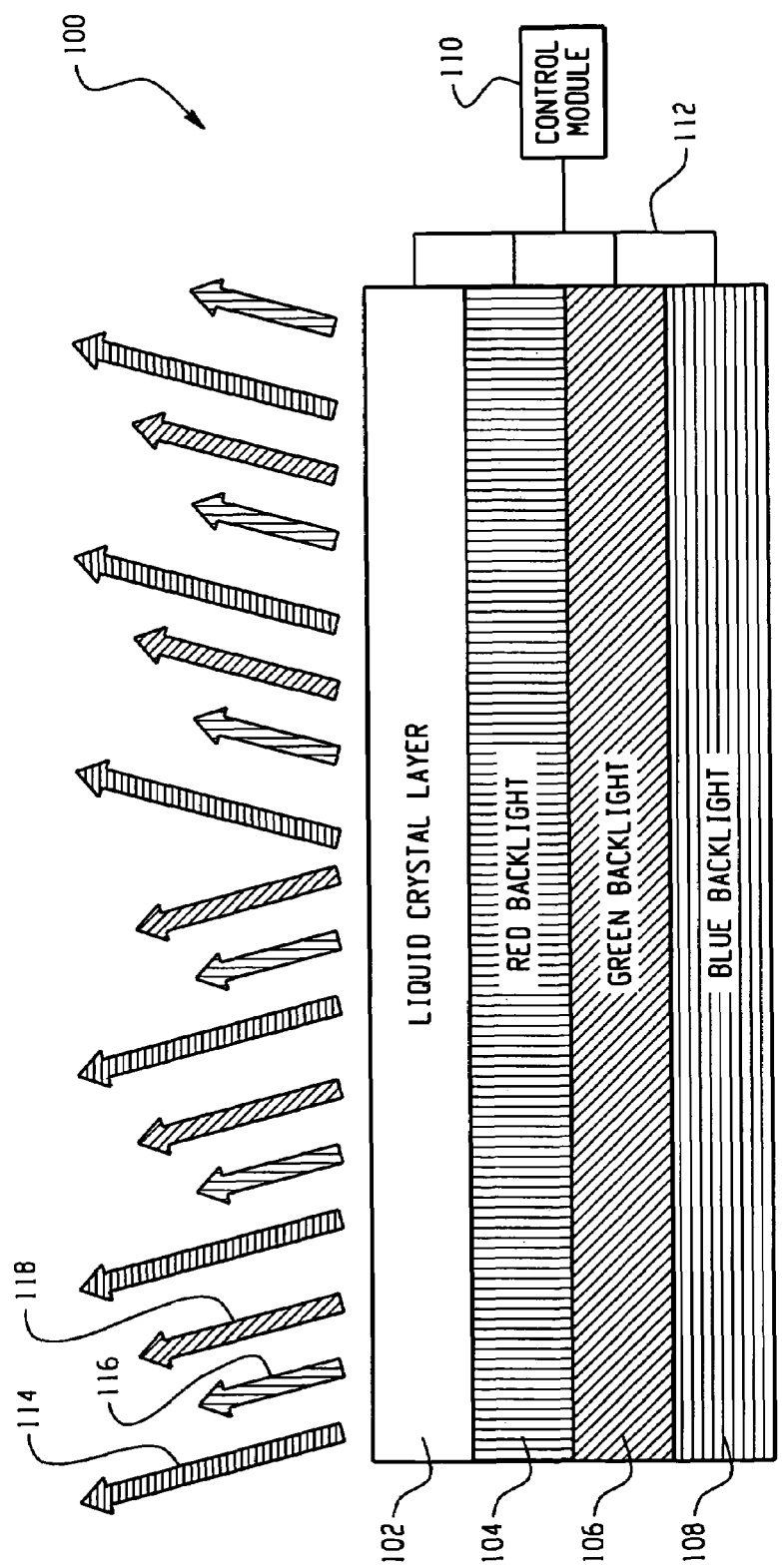
FIG. 4 is a block diagram of a FS LCD device using simultaneous rather than sequential backlighting.

FIG. 4 is a block diagram of a FS LCD device 100 using a continuous monochromatic display mode rather than the standard sequential color FS LCD mode. For simplicity, FIG. 4 shows a liquid crystal layer 102 on top of red 104, green 106, and blue 108 backlights. It should be understood, however, that the red 104, green 106, and blue 108 backlights may be located remote from each picture element and a light guide may transmit the light components to the picture elements (as shown in FIG. 2). Liquid crystal layer 102 can be, for example, a thin film transistor (TFT) display. A control module 110 controls the power levels of each backlight, and also controls the liquid crystal layer 102 using control lines 112. The control module may be a dedicated unit or may be integrated with other functional components of an electronic device.

In FIG. 4, each of the three backlights is outputting a different power level simultaneously, as indicated by the wavelength intensity bars for blue 114, red 116, and green 118. In this embodiment, the blue wavelength intensity bar 114 is the brightest, the green wavelength intensity bar 116 the next brightest, and the red wavelength intensity bar 118 the least brightest. When the intensity of each color is fixed and the backlights are illuminated continuously, the user perceives a single composite color. Under these conditions, characters formed by the liquid crystal layer 102 are contrasted by a monochromatic display color. This continuous mode of operation of the backlights provides a constant background color that does not flicker.

By adjusting the intensity of the red 104, green 106, and blue 108 backlights, the control module 110 can select a wide range of colors to be displayed as a background, and allows the FS LCD 100 to operate in a transmissive monochromatic display mode. The contrast of a transmissive display is significantly higher than the contrast of a reflective display. Additionally, because the backlight is providing the light source, the shadow effect caused by characters formed on the liquid crystal reflecting off a reflector may be eliminated.

Figure 5:
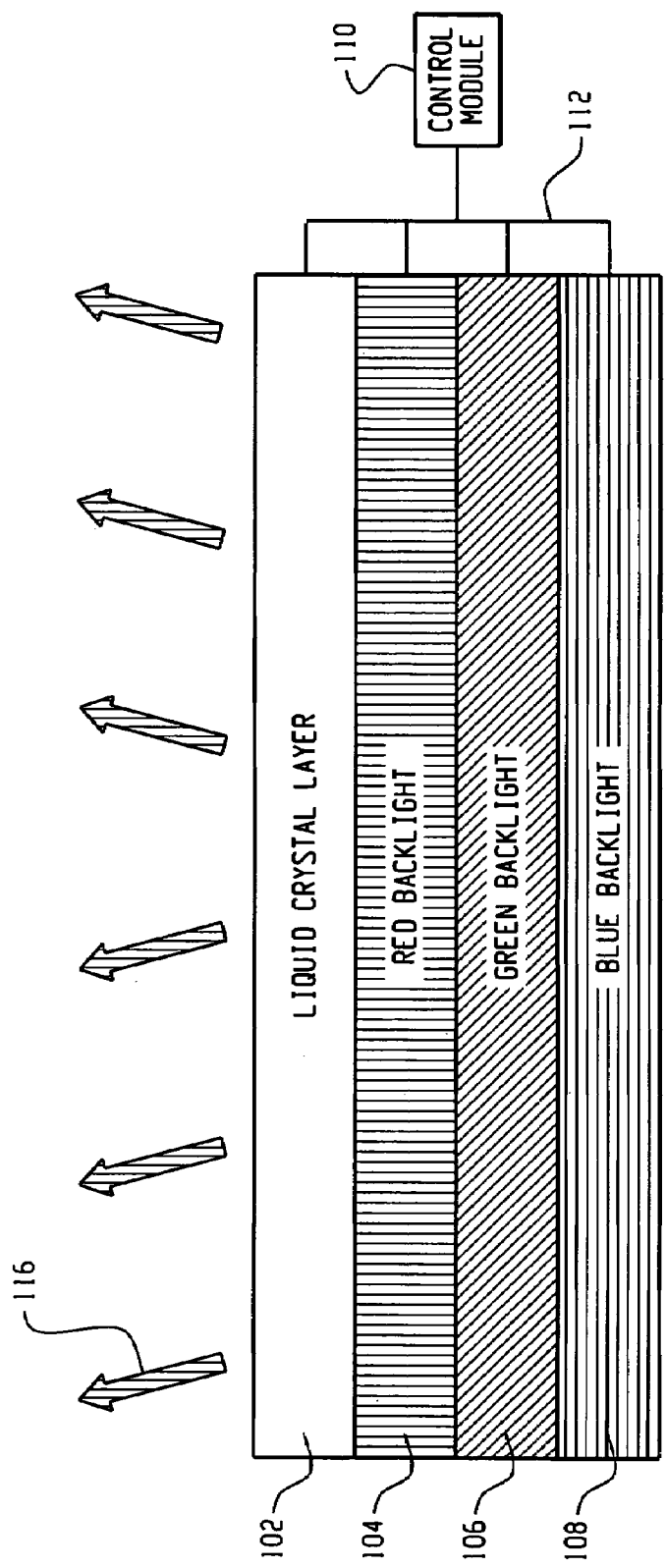
FIG. 5 is a block diagram of the FS LCD device shown in FIG. 4 with only the red backlight active.

FIG. 5 shows an alternative continuous monochromatic display mode. In FIG. 5, only the red 116 backlight is active and the user of the display will see a monochromatic red background on the FS LCD screen. In this mode, the control module 110 has only activated the red 116 backlight. By selectively activating a single backlight, power may be conserved. Other power conservation modes are possible by, for example, selectively activating the most power efficient color backlight, lowering the intensity of a single backlight, or by forming a composite color of multiple backlights illuminated at a low intensity. The intensity level of the backlights can be specified by the user. The contrast afforded characters formed on the liquid crystal of the display may depend on the intensity level of the backlights, which may be specified by the user to provide an acceptable contrast level.

The continuous monochromatic display modes described above can be selected while in another mode of operation. For example, if the user wanted to conserve power in order to extend battery life, he could switch to the continuous monochromatic display mode. Further, if the user was experiencing color separation in a standard FS LCD mode due to movement or vibration, he could switch to the continuous monochromatic display mode.

The frame rate frequency in the continuous monochromatic display modes described above can be any rate achievable by the liquid crystal. For example, the frame rate frequency in regular sequential color operation of an FS LCD may be 180 Hertz and the monochromatic display mode may continue this frame rate frequency. As a further example, because the backlights are operating continuously rather than sequentially, the frame rate frequency could be reduced. The frame rate frequency of the liquid crystal can be reduced to any level, however, below approximately 24 Hertz the human eye can detect individual frames. Preferably, the frame rate frequency is decreased to between about 24 and about 70 Hertz, more preferably between about 24 and about 40 Hertz, and even more preferably to about 24 Hertz. Reducing the frame rate of the liquid crystal also provides power savings.

Figure 6:
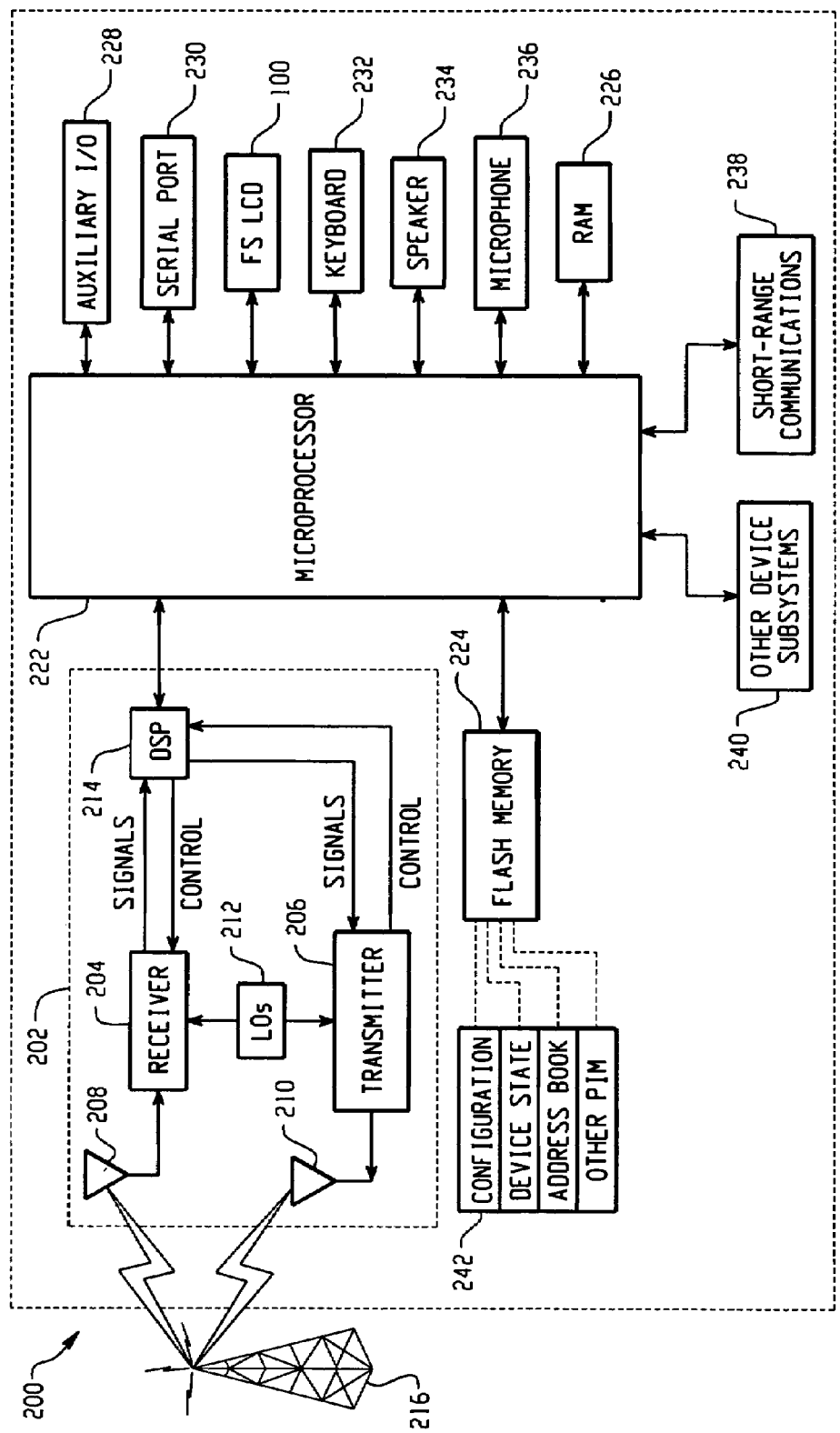
FIG. 6 is a block diagram of a mobile device with an FS LCD display using simultaneous rather than sequential backlighting.

FIG. 6 is a schematic diagram of a mobile device 200 that could be used with an FS LCD 100 as described above. The mobile device 200 may, for example, be a two-way communication device having voice and data communication capabilities. The mobile device may also be operable to communicate with other computer systems on the Internet. Depending on the functionality provided by the device, the device may be referred to as a data messaging device, a two-way pager, a cellular telephone with data messaging capabilities, a wireless Internet appliance, a data communication device, or by other names Where the mobile device 200 is enabled for two-way communications, it incorporates a communication subsystem 202, including a receiver 204 and a transmitter 206, as well as associated components such as one or more, preferably embedded or internal, antenna elements 208 and 210, local oscillators (LOs) 212, and a processing module such as a digital signal processor (DSP) 214. The particular design of the communication subsystem 202 may be dependent upon the communication network in which the device is intended to operate. For example, a mobile device 200 may include a communication subsystem 202 designed to operate within the Mobitex™ mobile communication system, the DataTAC™ mobile communication system, a CDMA network, an iDen network, or a GPRS network.

Network access requirements may also vary depending upon the type of network 216. For example, in the Mobitex and DataTAC networks, mobile devices 200 are registered on the network using a unique identification number associated with each mobile device. In GPRS networks however, network access is associated with a subscriber or user of a mobile device 200. A GPRS mobile device therefore requires a subscriber identity module, commonly referred to as a SIM card, in order to operate on a GPRS network. Without a valid SIM card, a GPRS mobile device may not be fully functional. Local or non-network communication functions, as well as legally required functions (if any) such as "911" emergency calling, may be operable, but the mobile device 200 may be unable to carry out any other functions involving communications over the network 216.

When required network registration or activation procedures have been completed, a mobile device 200 may send and receive communication signals over the network 216. Signals received by the antenna 208 through a communication network 216 are input to the receiver 204, which may perform such common receiver functions as signal amplification, frequency down conversion, filtering, channel selection and the like, and in the example system shown in FIG. 6, analog to digital conversion. Analog to digital conversion of a received signal allows more complex communication functions, such as demodulation and decoding, to be performed in the DSP 214. In a similar manner, signals to be transmitted are processed by the DSP 214 and input to the transmitter 206 for digital to analog conversion, frequency up conversion, filtering, amplification and transmission over the communication network 216 via the antenna 210.

The DSP 214 may also provide receiver and transmitter control. For example, the gains applied to communication signals in the receiver 204 and transmitter 206 may be adaptively controlled through automatic gain control algorithms implemented in the DSP 214.

The mobile device 200 may include a microprocessor 222, which controls the overall operation of the device. Communication functions, such as data and voice communications, are performed through the communication subsystem 202. The microprocessor 222 also interacts with further device subsystems such as the FS LCD 100, flash memory 224, random access memory (RAM) 226, auxiliary input/output (I/O) subsystems 228, serial port 230, keyboard 232, speaker 234, microphone 236, a short-range communications subsystem 238 and any other device subsystems generally designated as 240.

Some of the subsystems shown in FIG. 6 perform communication-related functions, whereas other subsystems may provide "resident" or on-device functions. Some subsystems, such as keyboard 232 and FS LCD 100, may be used for both communication-related functions, such as entering a text message for transmission over a communication network, and device-resident functions such as a calculator or task list.

Operating system software used by the microprocessor 222 may be stored in a persistent store, such as flash memory 224, a read only memory (ROM), or similar storage element. The operating system, specific device applications, or parts thereof, may be temporarily loaded into a volatile store such as RAM 226. Received communication signals may also be stored to RAM 226.

As shown, the flash memory 224 can be segregated into different areas for computer programs and program data storage 242. These different PIM storage types indicate that each program can allocate a portion of flash memory 224 for its database requirements. The microprocessor 222, in addition to its operating system functions, may enable execution of software applications on the mobile device. A predetermined set of applications that control basic operations, such as data and voice communication applications may normally be installed on the mobile device 200 during manufacturing. For example, one software application may be a personal information manager (PIM) application operable to organize and manage data items relating to the user of the mobile device such as, but not limited to, e-mail, calendar events, voice mails, appointments, task items, or others. One or more memory stores may be available on the mobile device to facilitate storage of PIM data items. Such PIM application may have the ability to send and receive data items via the wireless network 216. In a preferred embodiment, the PIM data items are seamlessly integrated, synchronized and updated, via the wireless network 216, with the mobile device user's corresponding data items stored or associated with a host computer system. Further applications may also be loaded onto the mobile device 200 through the network 216, an auxiliary I/O subsystem 228, serial port 230, short-range communications subsystem 238 or any other suitable subsystem 240, and installed by a user in the RAM 226 or preferably a non-volatile store for execution by the microprocessor 222.

In a data communication mode, a received signal such as a text message or web page download is processed by the communication subsystem 202 and input to the microprocessor 222, which may further processes the received signal for output to the display 100 or to an auxiliary I/O device 228. A user of mobile device 202 may also compose data items, such as email messages, using the keyboard 232, which is preferably a complete alphanumeric keyboard or telephone-type keypad, in conjunction with the display 422 and possibly an auxiliary I/O device 228. Such composed items may be transmitted over a communication network through the communication subsystem 202.

For voice communications, overall operation of the mobile device 200 is similar, except that received signals may be output to a speaker 234 and signals for transmission may be generated by a microphone 236. Alternative voice or audio I/O subsystems, such as a voice message recording subsystem, may also be implemented on the mobile device 200. Although voice or audio signal output is preferably accomplished primarily through the speaker 234, the FS LCD 100 may also be used to provide an indication of the identity of a calling party, the duration of a voice call, or other voice call related information for example.

The serial port 230 may be implemented in a personal digital assistant (PDA)-type mobile device to synchronize with a user's desktop computer. A serial port 230 may enable a user to set preferences through an external device or software application and may provide a path for information or software downloads to the mobile device 200 other than through a wireless communication network. The serial port 230 may, for example, be used to load an encryption key onto the device through a direct and thus reliable and trusted connection to thereby enable secure device communication.

A short-range communications subsystem 238 may be included to provide communication between the mobile device 200 and different systems or devices. For example, the subsystem 238 may include an infrared device and associated circuits and components or a Bluetooth™ communication module to provide for communication with similarly-enabled systems and devices.

What is claimed is:

1. An electronic device, comprising:
   a field sequential liquid crystal display with a liquid crystal layer and a plurality of color backlights; and
   a control module for controlling the continuous illumination of one or more of the plurality of color backlights to provide a monochromatic source of light behind the liquid crystal layer, wherein the frame rate frequency of the field sequential liquid crystal display is set to between about 24 and about 70 Hertz.

2. The device of claim 1, wherein individual intensities of the one or more of the plurality of backlights are selected to achieve a user selected color.

3. The device of claim 1, wherein individual intensities of the one or more of the plurality of backlights are minimized while providing a user acceptable contrast level.

4. The device of claim 1, wherein a output intensity of one or more of the plurality of backlights is set to zero.

5. The device of claim 1, wherein only one backlight is illuminated.

6. The device of claim 5, wherein the backlight with the lowest power consumption is selectively illuminated.

7. The device of claim 1, wherein the continuous illumination of the one or more of the plurality of backlights is one of a plurality of display modes that can be selected by the user.

8. The device of claim 1, wherein the frame rate frequency of the field sequential liquid crystal display is set to between about 24 and about 40 Hertz.

9. A method for providing a monochromatic background display mode in an electronic device having a field sequential liquid crystal display with a plurality of color backlights, comprising:
   setting the frame rate frequency of the field sequential liquid crystal display to between about 24 and about 70 Hertz; and
   continuously illuminating one or more of the plurality of color backlights of the field sequential liquid crystal display.

10. The method of claim 9, wherein individual intensities of the one or more of the plurality of backlights are selected to achieve a user selected color.

11. The method of claim 9, wherein the individual intensities of the one or more of the plurality of backlights are minimized while providing a user acceptable contrast level.

12. The method of claim 9, wherein the output intensity of one or more of the plurality of backlights is set to zero.

13. The method of claim 9, wherein only one backlight is illuminated.

14. The method of claim 13, wherein the backlight with the lowest power consumption is selectively illuminated.

15. The method of claim 9, wherein the continuous illumination of one or more of the plurality of backlights is one of a plurality of display modes that can be selected by the user.

16. An electronic device, comprising:
a field sequential liquid crystal display with a liquid crystal layer and a plurality of color backlights; and
a control module for controlling the continuous illumination of one or more of the plurality of backlights to provide a monochromatic source of light behind the liquid crystal layer, wherein the frame rate frequency of the field sequential liquid crystal display is set to between about 24 and about 40 Hertz, and the individual intensities of the one or more of the plurality of backlights are selected to achieve a user selected color.

17. The electronic device of claim 16, wherein individual intensities of the one or more of the plurality of backlights are minimized while providing a user acceptable contrast level.

18. The electronic device of claim 16, wherein a output intensity of one or more of the plurality of backlights is set to zero.

19. The electronic device of claim 16, wherein only one backlight is illuminated.

20. The electronic device of claim 19, wherein the backlight with the lowest power consumption is selectively illuminated.

21. The electronic device of claim 16, wherein the continuous illumination of the one or more of the plurality of backlights is one of a plurality of display modes that can be selected by the user.

* * * * *

UNITED STATES PATENT AND TRADEMARK OFFICE
CERTIFICATE OF CORRECTION

PATENT NO.       : 7,233,310 B2                                   Page 1 of 1
APPLICATION NO.  : 10/785638
DATED            : June 19, 2007
INVENTOR(S)      : Lazaridis et al.

It is certified that error appears in the above-identified patent and that said Letters Patent is hereby corrected as shown below:

Title page, under Related U.S. Application Data (60), replace "60/494,398" with -- 60/494,368 --

Column 1, line 5, replace "60/494,398" with -- 60/494,368 --

Signed and Sealed this
Twenty-ninth Day of November, 2011

David J. Kappos
*Director of the United States Patent and Trademark Office*